United States Patent
Christmann et al.

(10) Patent No.: US 8,629,675 B2
(45) Date of Patent: Jan. 14, 2014

(54) LINEAR SENSOR

(75) Inventors: Ralf Christmann, Kaiserslautern (DE);
Stefan Leopold, Brackenheim (DE);
Arno Marto, Weil der Stadt (DE);
Wolfgang Schuele, Stuttgart (DE);
Klaus-Juergen Wagner, Grossbottwar (DE)

(73) Assignees: BorgWarner BERU Systems GmbH, Ludwigsburg (DE); BorgWarner Inc. MI (US)

( * ) Notice: Subject to any disclaimer, the term of this patent is extended or adjusted under 35 U.S.C. 154(b) by 383 days.

(21) Appl. No.: 12/811,803

(22) PCT Filed: Dec. 12, 2008

(86) PCT No.: PCT/EP2008/010706
§ 371 (c)(1),
(2), (4) Date: Aug. 20, 2010

(87) PCT Pub. No.: WO2009/086889
PCT Pub. Date: Jul. 16, 2009

(65) Prior Publication Data
US 2010/0308807 A1 Dec. 9, 2010

(30) Foreign Application Priority Data
Jan. 8, 2008 (DE) .................. 10 2008 003 482

(51) Int. Cl.
*G01B 7/14* (2006.01)
*G01B 7/30* (2006.01)
*H01L 43/06* (2006.01)
*G01R 33/02* (2006.01)

(52) U.S. Cl.
USPC ........... 324/207.24; 324/207.11; 324/207.2; 324/207.13

(58) Field of Classification Search
USPC ........... 324/207.15, 207.16, 207.22, 207.23, 324/207.24, 207.25, 163, 166, 173, 260, 324/261, 262, 207.26
See application file for complete search history.

(56) References Cited

U.S. PATENT DOCUMENTS 3,604,115 A * 9/1971 McDonald ............... 30/348
4,006,628 A * 2/1977 St. Jacques ............ 73/862.541
(Continued)

FOREIGN PATENT DOCUMENTS

| DE | 196 24 233 C1 | 10/1997 |
| GB | 349213 A | 5/1931 |
| WO | WO 01/01066 A1 | 1/2001 |

OTHER PUBLICATIONS

J.K. Lancaster, The effect of carbon fibre reinforcment on the friction and wear of polymers, 1968, Brit. J. Appl. Phys (J. Phys. D) Ser. 2 vol. 1 Printed in Great Britain.*

(Continued)

*Primary Examiner* — Arleen M Vazquez
*Assistant Examiner* — Christopher McAndrew

(57) ABSTRACT

A linear sensor is described with a casing (5), with a pin (7) which contains a permanent magnet (1) and which is mounted in the casing (5) in a linearly displaceable manner against the force of a spring (6), and with a magnetic field sensor (3) attached to said casing (5) for detecting of a displacement of the permanent magnet (1). The invention provides that the pin (7) is controlled by a first cylindrical guide (8) and a second cylindrical guide (8).

18 Claims, 1 Drawing Sheet

(56) References Cited

U.S. PATENT DOCUMENTS

| | | | |
|---|---|---|---|---|
| 4,970,463 A | * | 11/1990 | Wolf et al. | 324/207.2 |
| 5,021,737 A | * | 6/1991 | Schutts | 324/207.11 |
| 5,115,186 A | * | 5/1992 | Reinartz et al. | 324/207.22 |
| 5,789,920 A | * | 8/1998 | Gass | 324/260 |
| 2004/0129095 A1 | * | 7/2004 | Churchill et al. | 73/866.5 |
| 2006/0022667 A1 | * | 2/2006 | Nyce | 324/207.24 |
| 2006/0208724 A1 | | 9/2006 | Reichert et al. | |

OTHER PUBLICATIONS

J.K. Lancaster, The effect of carbon fibre reinforcment on the friction and wear of polymers, 1968, Brit. J. Appl. Phys (J. Phys. D) Ser. 2 V© L. 1 Printed in Great Britain.*

* cited by examiner

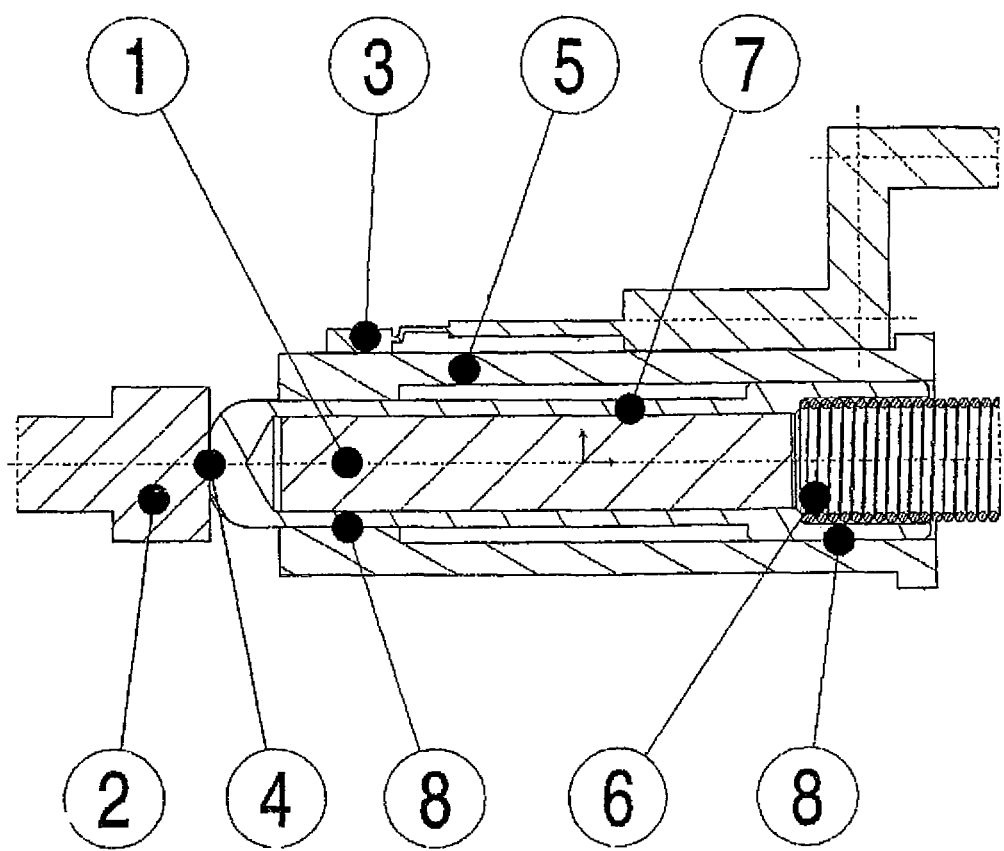

LINEAR SENSOR

The invention relates to a linear sensor, comprising a sleeve, a pin which contains a permanent magnet and is supported in the sleeve so it can be linearly displaced against the force of a spring, and a magnetic field sensor that is attached to the sleeve for detecting a displacement of the permanent magnet.

Such linear sensors are used in motor vehicle technology, for example, for controlling brake boosters, the activation of which is carried out as a function of the travel of a brake pedal. As the pedal travel increases, the brake pressure acting on a control member is increased, the travel of which can be determined by way of a linear sensor. Another example is boost-pressure controllers for exhaust gas turbochargers. In such applications, in general the pin of the linear sensor is pressed against a movable measurement object, such as a control member, by a spring force, so that the pin always rests against the measurement object and follows the movement thereof.

A linear sensor is known from DE 196 24 233 C1, wherein a cuboid permanent magnet is displaced relative to a magnetic field sensor disposed in a stationary manner on a housing. The known linear sensor, however, is less suited for applications in motor vehicle technology, because it is sensitive to vibrations which may develop due to engine operation, is prone to wear, and requires high manufacturing costs and frequent adjustments.

It is therefore an object of the invention to provide a way for creating a linear sensor which is suited for motor vehicle technology, is cost-effective to produce, and enables precise measurements, even if vibrations occur during driving operation.

SUMMARY OF THE INVENTION

In a linear sensor according to the invention, highly precise guidance of the pin is achieved using very simple means, preferably in that a constriction of the sleeve forms the first guide, which is supplemented by a second guide formed by a thickening of the pin. However, it is also possible to design the first and second guides each by a constriction of the sleeve.

Transverse movements of the pin resulting in measurement errors can be largely excluded with a linear sensor according to the invention. The position of a measurement object can therefore be precisely determined even if vibrations occur, such as those caused by operation of the engine, when using a linear sensor according to the invention.

Because the pin and the sleeve only come in contact with each other on the two guides, which is preferred, advantageously small friction surfaces are created. Small friction surfaces produce low friction forces, thereby enabling low-wear operation and high long-term stability.

The constriction is preferably located at an end of the sleeve, particularly at the end of the sleeve from which the pin protrudes. This measure has the advantage that a two-point guidance caused by the constriction of the sleeve and the thickening of the pin can take place over the largest distance possible and therefore with the highest precision possible. For the same reasons it is also preferred that the thickening is located at an end of the pin.

The magnetic field sensor is preferably attached to a section of the sleeve forming the constriction. This measure has the advantage that the distance between the magnetic field sensor and the pin, measured perpendicular to the direction of movement of the pin, remains constant, even under engine-related vibrations, and can therefore always be measured with high accuracy.

The pin preferably has a circular cross-section, which simplifies production and is favorable for low friction. It is particularly preferred if the pin can be rotated about the longitudinal axis thereof in the sleeve. During the operation of a vehicle, vibrations or movements of the measurement object may cause a torque to be applied on the pin. Because the pin can be rotated, such torques can relax without applying stress on the guidance of the pin.

According to an advantageous refinement of the invention, the pin and/or the sleeve are made of a graphite particle-containing plastic. In this way, abrasion, which is inevitable during operation, ensures a continuous supply of lubricant due to the release of graphite particles. Even after long operation, in this way low friction forces are always ensured, so that an accordingly designed linear sensor can be operated stably over very long periods. It is particularly preferred that the pin is made of a graphite particle-containing plastic, in particular that the sleeve is made of a graphite particle-free plastic.

According to another advantageous refinement of the invention, the sleeve and the pin are made of the same plastic, apart from an optionally present addition of graphite particles. In this way, the thermal coefficient of expansions between the sleeve and pin agree, resulting in consistently precise guidance over a very wide temperature range. Thermoset materials are the preferred materials for the sleeve and the pin.

According to a further advantageous refinement of the invention, the pin is rounded off at the end thereof protruding from the sleeve. This measure has the advantage that the risk of tilting the measurement object, which could impair the measuring accuracy, is reduced when pressing the pin against a measurement object.

At the end protruding from the sleeve, the pin preferably has a face, the diameter of which is 20% to 60% of the inside diameter of the sleeve at the constriction. A face that is reduced with respect to the pin diameter causes the transmission of transverse forces to be reduced in the event that the measurement object is tilted. As a result, the guidance of the pin in the sleeve is subjected to lower stress, and transverse movements impairing the measuring accuracy can be prevented more easily. A face having a diameter that is 20% to 60% the diameter of a cylindrical pin section supported in the sleeve is also large enough to limit the surface load of the contact surface resting against the measurement object to a degree that is suitable for low-wear operation.

BRIEF DESCRIPTION OF THE DRAWINGS

Further details and advantages of the invention will be explained based on an exemplary embodiment with reference to the attached figure. The characteristics described can become subject matters of claims either individually or in combination with each other.

FIG. 1: shows an embodiment of a linear sensor in a longitudinal section.

DETAILED DESCRIPTION

FIG. 1 shows a linear sensor comprising a sleeve 5, in which a cylindrical pin 7 is supported so it can be linearly displaced against the force of a spring 6. The pin 7 comprises a permanent magnet 1, which preferably is a bar magnet, and rests against a measurement object 2 with the end 4 thereof protruding from the sleeve 5. If the distance of the measurement object 2 from the sleeve 5 increases, the pin 7 is pushed further out of the sleeve 5 by the spring 6. As the measurement object 2 approaches the sleeve 5, the pin 7 is pushed further into the sleeve 5 against the force of the spring 6.

A magnetic field sensor 3, preferably a Hall sensor, is attached to the sleeve 5. A displacement of the pin 7 comprising the permanent magnet 1 disposed therein brings about a change in the magnetic field at the site of the magnetic field sensor 3. By evaluating this change, the position of the permanent magnet 1 and hence that of the measurement object 2 can be determined.

The pin 7 comes in contact with the sleeve 5 at two guiding surfaces 8. A first guiding surface 8 is formed by a constriction of the sleeve 5, which is preferably located at the end 4 of the sleeve 5 with which the pin 7 protrudes from the sleeve 5. A second guiding surface 8 is formed by a thickening of the pin 7, preferably at the end thereof facing away from the measurement object 2. In this way, the constriction of the sleeve 5 forms a first guide, which is supplemented by a second guide formed by the thickening of the pin 7. In this way, very precise and low-friction guidance is achieved.

The pin 7 and the sleeve 5 come in contact with each other in a two-dimensional manner in the region of the guiding surfaces 8, which further increases the precision of axial and radial guidance. For this purpose, the constriction is designed as a section of the sleeve 5 which has a reduced inside diameter, and the thickening of the pin is cylindrical, so that the guiding surfaces 8 in each case are cylindrical surfaces. It is advantageous to attach the magnetic field sensor 3 to the section of the sleeve 5 forming the constriction, because there the distance of the pin 7 from the magnetic field sensor 3 perpendicular to the direction of movement of the pin 7 remains constant with the highest accuracy, even if vibrations occur.

The spring 6 acts on an end of the pin 7, this being the end having the thickening. In the embodiment illustrated, the thickening has a sleeve-like extension, into which the spiral coiled spring 6 protrudes. The spiral coiled spring 6 is supported on an abutment, which is not shown and which is preferably disposed outside of the sleeve 5, but in principle can also be formed directly by the sleeve 5.

At the end 4 protruding from the sleeve 5, the pin 7 is rounded off and has a flat face, the diameter of which is 50% of the inside diameter of the sleeve 5 at the constriction thereof in the illustrated embodiment. Due to this geometric design, not only a sufficiently large contact surface for a low surface load is achieved, but also a low-wear operation. In addition, a reduced support surface minimizes friction, and the transmission of transverse forces during potential tilting of the measurement object 2 is prevented. In general, it is advantageous if the face has a diameter of approximately 20 to 60% of the inside diameter of the sleeve 5 at the constriction.

The pin 7 is produced by insert molding the permanent magnet 1 using a thermoset material. The sleeve 5 is also made of a thermoset material, preferably the same thermoset material. In this way, the pin 7 and the sleeve 5 have similar thermal expansion coefficients, whereby jamming and clearance are prevented in the region of the guiding surfaces 8 within a wide temperature range. The illustrated linear sensor can thus be installed in particular in the engine compartment of a motor vehicle and heat up to 170° C. during operation without impairment.

In order to improve the sliding properties, it is preferable to use a thermoset material having added graphite particles for the pin 7. The added graphite particles reduce the hardness of the thermoset material. In this way, inevitable abrasion during operation will occur practically exclusively at the pin 7, but not at the sleeve 5. Because the abrasion comprises a graphite filler, the abrasive dust acts as a lubricant in the guiding surfaces 8. This advantage can also be used in that the sleeve 5, instead of the pin 7 or in addition to the pin 7, is produced from graphite particle-containing plastic.

However, it is particularly advantageous if the thermoset material of the pin 7 comprises graphite particles. Abrasion occurring at the face 4 then reduces friction and therefore lowers the transversal forces, which can develop during tilting of the measurement object 2. In principle, it is also possible to use graphite particle-containing plastic for both the sleeve 5 and the pin 7. Due to the increased abrasion, however, this is not preferred.

REFERENCE NUMERALS

1 Permanent magnet
2 Measurement object
3 Magnetic field sensor
4 End
5 Sleeve
6 Spring
7 Pin
8 Guiding surface

The invention claimed is:

1. A linear sensor, comprising:
 a sleeve;
 a plastic pin which contains a permanent magnet fixed in non-movable relationship to the pin, where the pin is supported in the sleeve so it can be linearly displaced against the force of a single spring, the spring arranged concentrically with the pin, and the pin including an end protruding beyond the sleeve configured to abut a contactable measurement object, wherein the spring is configured to bias the in to protrude beyond the sleeve to abut the contactable measurement object; and
 a magnetic field sensor which is attached to the sleeve for detecting a displacement of the permanent magnet, wherein the pin is guided by a first cylindrical guide and a second cylindrical guide;
 wherein the first guide of the pin is formed by a contiguously formed constriction of the sleeve on which the pin comes in contact with the sleeve, and that the second guide is formed by a contiguously formed thickening of the pin which comes in contact with the sleeve;
 wherein the thickening has a sleeve-like extension into which the spring protrudes.

2. The linear sensor of claim 1, wherein both the permanent magnet and the magnetic field sensor are substantially disposed at the constriction of the sleeve on which the in comes in contact with the sleeve.

3. The linear sensor according to claim 1, wherein the constriction is located at an end of the sleeve.

4. The linear sensor according to claim 1, wherein the constriction is designed as a sleeve section having a reduced inside diameter.

5. The linear sensor according to claim 1, wherein the constriction is located at an end of the pin.

6. The linear sensor according to claim 1, wherein the spring acts on an end of the pin.

7. The linear sensor according to claim 1, wherein the pin and/or the sleeve are made of a graphite particle-containing plastic.

8. The linear sensor according to claim 1, wherein the pin is made of a graphite particle-containing plastic.

9. The linear sensor according to claim 1, wherein the sleeve is made of a thermoset material.

10. The linear sensor according to claim 1, wherein the pin is made of a thermoset material.

11. The linear sensor according to claim 10, wherein the sleeve and the pin are made of the same thermoset material, apart from potentially added graphite particles.

12. The linear sensor according to claim 1, wherein the pin is produced by insert molding the permanent magnet.

13. The linear sensor according to claim 1, wherein the pin has a circular cross-section.

14. The linear sensor according to claim 1, wherein the pin is rounded off at the end thereof protruding from the sleeve.

15. The linear sensor according to claim 1, wherein at the end protruding from the sleeve, the pin has a face, the diameter of which is 20% to 60% of the inside diameter of the sleeve at the constriction.

16. The linear sensor according to claim 1, wherein the magnetic field sensor is attached to a section of the sleeve forming the constriction.

17. The linear sensor according to claim 1, wherein the pin can be rotated in the sleeve.

18. A linear sensor, comprising:
   a sleeve;
   a pin configured to be linearly displaced within the sleeve and comprising an abutment end, the abutment end configured to touch adjacently upon a contactable measurement object wherein the pin protrudes beyond the sleeve;
   a permanent magnet attached and fixed relative to the pin;
   a single spring pressing against the pin or the permanent magnet and configured to bias the abutment end to touch adjacent upon the contactable measurement object; and
   a magnetic field sensor attached to an outside of the sleeve and configured to detect a displacement of the permanent magnet;
   wherein the pin is guided by a first cylindrical guide and a second cylindrical guide, wherein the first cylindrical guide of the pin is formed by a contiguously formed constriction of the sleeve on which the pin comes in contact with the sleeve, and that the second cylindrical guide is formed by a contiguously formed thickening of the pin on which the pin comes into contact with the sleeve;
   wherein both the permanent magnet and the magnetic field sensor are substantially disposed at the constriction of the sleeve on which the in comes in contact with the sleeve.

* * * * *

UNITED STATES PATENT AND TRADEMARK OFFICE
CERTIFICATE OF CORRECTION

| | |
|---|---|
| PATENT NO. | : 8,629,675 B2 |
| APPLICATION NO. | : 12/811803 |
| DATED | : January 14, 2014 |
| INVENTOR(S) | : Ralf Christmann et al. |

It is certified that error appears in the above-identified patent and that said Letters Patent is hereby corrected as shown below:

In the Claims:

Column 4, lines 35 and 50, the word "in" should be changed to --pin--.

Signed and Sealed this
Eighteenth Day of March, 2014

Michelle K. Lee
*Deputy Director of the United States Patent and Trademark Office*